United States Patent
Beghini et al.

(10) Patent No.: US 6,267,512 B1
(45) Date of Patent: Jul. 31, 2001

(54) SUSPENSION THRUST BEARING DEVICE

(75) Inventors: Eric Beghini, La Membrole (FR); Reinhard Liesener, Winterbach; Günther Handke, Euerbach, both of (DE); Lars Winslott, Getinge (SE)

(73) Assignees: SKF France, Clamart (FR); Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/320,678

(22) Filed: May 27, 1999

(30) Foreign Application Priority Data

May 28, 1998 (FR) .................................................. 98 06748

(51) Int. Cl.[7] ...................................................... F16C 19/12
(52) U.S. Cl. ........................... 384/609; 384/613; 384/607
(58) Field of Search .................................. 384/592, 607, 384/609, 611, 612, 614, 615, 617, 618, 620, 621, 622, 629, 613; 267/220, 179; 280/668

(56) References Cited

U.S. PATENT DOCUMENTS

| | | | |
|---|---|---|---|
| 4,466,751 | * 8/1984 | Higuchi | 384/607 X |
| 4,497,523 | * 2/1985 | Lederman | 384/613 |
| 4,505,524 | * 3/1985 | Krall | 384/615 |
| 4,566,812 | * 1/1986 | Takei et al. | 384/607 X |
| 4,618,130 | * 10/1986 | Veglia | 280/668 X |
| 4,696,588 | * 9/1987 | Tanaka et al. | 384/615 |
| 4,699,530 | * 10/1987 | Satoh et al. | 384/609 |
| 4,780,005 | * 10/1988 | Toyoshima et al. | 384/607 |
| 4,948,272 | * 8/1990 | Stowe | 384/607 |
| 4,969,752 | * 11/1990 | Kubota et al. | 384/607 X |
| 4,995,737 | 2/1991 | Moller et al. | |
| 5,344,241 | * 9/1994 | Wells | 384/607 |
| 5,467,971 | 11/1995 | Hurtubise et al. | |
| 5,618,116 | * 4/1997 | Ishikawa | 384/607 |
| 5,664,892 | 9/1997 | Kellam | 384/615 |

FOREIGN PATENT DOCUMENTS

| | | |
|---|---|---|
| 29506796 | 4/1995 | (DE) . |
| 0 390 331 | 10/1990 | (EP) . |
| 2 513 334 | 3/1983 | (FR) . |
| 2 697 472 | 5/1994 | (FR) . |
| 2 217 663 | 11/1989 | (GB) . |
| WO89 05242 | 6/1989 | (WO) . |

* cited by examiner

Primary Examiner—Charles A Marmor
Assistant Examiner—Colby Hansen
(74) Attorney, Agent, or Firm—Smith, Gambrell & Russell LLP

(57) ABSTRACT

A suspension thrust-bearing device for a telescopic suspension strut of a motor vehicle which includes a rolling bearing forming an axial thrust stop, a metal cup for accepting a suspension spring, and an elastic support block. The rolling bearing is positioned between the metal cup and the elastic support block which is secured to the frame of the motor vehicle. The rolling bearing includes an upper race placed within a cap which is in contact with the support block, and a lower race. The cap is provided with means for axially retaining the metal cup, to form a unit assembly, and acts as an interface between the upper race and the elastic support block. An outer cylindrical portion of the cap covers the periphery of the metal cup.

34 Claims, 5 Drawing Sheets

SUSPENSION THRUST BEARING DEVICE

BACKGROUND OF THE INVENTION

1. Field of the Invention

The invention relates to the field of suspension thrust bearing used, in particular, in motor vehicles on the telescopic suspension struts of the steered wheels.

The suspension thrust bearing is generally placed at the top of the suspension strut between a lower metal cup which also acts as a seat for the suspension spring, and an elastic support block. The elastic support block is made up of metallic and elastomer elements and is secured to the vehicle body. The suspension spring is arranged around the rod of a damper piston whose end, generally the end of the piston rod, is secured to the elastic support block. The suspension thrust bearing thus allows axial loads to be transmitted between the spring and the vehicle body while at the same time allowing a relative angular movement between the spring cup, which is able to rotate, and the fixed elastic support block secured to the body. This relative angular movement may be the result of a turning of the steered wheel and/or compression of the suspension spring.

It is important to make the transportation and assembly of the suspension thrust bearing with the surrounding components, and in particular with the metal cup which forms the spring seat, easier.

2. Description of the Related Art

For this, document U.S. Pat. No. 4,995,737 proposes that each of the races of the suspension thrust bearing be equipped with a plastic cap. Each cap has projections for the axial retention of the other cap, and one of the two caps has hooks capable of interacting with apertures made in the lower cup. It is thus possible to produce the suspension thrust bearing and the lower cup as a permanently-assembled entity thus making easier the operations of transporting and handling the thrust bearing/cup subassembly, the operations of mounting the subassembly in the vehicle suspension strut system and the automating of at least some of these operations.

A device of this kind does, however, have certain drawbacks:

- it dictates the use of two caps made of plastic, hence increasing the cost and axial bulk of the assembly.
- it dictates the use of two races for the thrust bearing which, again, leads to an increase in the cost and axial bulk of the assembly.
- it dictates that the lower cup must have, in a precise location, an opening to interact with the hook of the lower cap, hence increasing the cost.
- on assembly, it is necessary angularly to orientate the lower cap of the thrust bearing relative to the opening in the cup, this making this operation and any automating thereof more complicated, thereby once again increasing the cost.

Document DE U 295 06 796 discloses a suspension thrust bearing device comprising a rolling bearing with two metal races, the lower race being in contact with a lower plastic cap which also acts as a spring seat, thus precluding the possibility of using the cup as a raceway for the rolling bodies.

BRIEF SUMMARY OF THE INVENTION

The present invention sets out to solve these problems using simple and inexpensive means, at the same time making it possible to reduce the number of parts, the axial bulk and the costs, and to simplify the assembly process.

The suspension thrust bearing device, according to the invention, is of the type comprising a rolling bearing forming an axial thrust bearing, a cup for a spring, and an elastic support block. The rolling bearing is placed between the cup and the elastic support block secured to the vehicle frame, and comprises an upper race placed inside a cap acting as an interface between said race and the elastic support block in contact with the cap, and a lower race. The cap has means of axially retaining the cup with a view to forming a unit assembly. Part of the cap covers the periphery of the cup and forms a means of axially retaining the cup relative to the cap, said cup being made of metal. Thus, the cap can be mounted on the cup without angularly orientating it beforehand, while at the same time allowing the use of a lower bearing race which is thin or is built into the cup.

In one embodiment of the invention, the cap comprises at least a radial protuberance directed inwardly arranged on the bore of a cylindrical part or the said cap, for example in the shape of a rim continuous or not, or of circumferentially distributed hooks, Advantageously, the cap comprises a sealing means adapted to cooperate with the cup, for example a sealing lip. The cylindrical part may form a narrow passage with the periphery of the cup.

Advantageously, the cap comprises a radial part adjacent to the cylindrical part and provided with a surface for bearing against the support block.

In one embodiment of the invention, the cap comprises a part of a shape that mates with the upper race.

In one embodiment of the invention, the cap comprises an inner cylindrical pan capable of interacting by its internal diameter with an axial part of the support block on which said cap comes for centering.

In one embodiment of the invention, the lower race and the cup form a single piece.

In another embodiment of the invention, the two races of the rolling bearing are identical.

The cup may be made of steel or light alloy.

The cap is made of a synthetic material, preferably a plastic material. The cap may be made of a material different from the one forming the elastic support block.

In one embodiment of the invention, the axial retaining of the bearing cup with the cap is made by diametral interference between the means of axially retaining of the cap and the periphery of the bearing cup.

In another embodiment of the invention, the axial retaining of the bearing cup with the cap is made by diametral interference between the means of axially retaining of the cap and tho periphery of an intermediary bearing seat of the spring arranged axially between the spring and the bearing cup.

The sealing of the thrust bearing is carried out, independently from the elastic support block, by means joined with the cage and/or the cap. There is thus obtained in a particularly economical way an assembly which combines the suspension thrust bearing and the lower cap forming a seat for the spring. What is more, this assembly is not very bulky, and is easy to assemble, to transport, to handle and to build into the vehicle suspension system.

The invention will be better understood from studying the detailed description of a number of embodiments taken by way of non-limiting examples and illustrated by the appended drawings, in which:

DETAILED DESCRIPTION OF THE INVENTION

Figure 1:
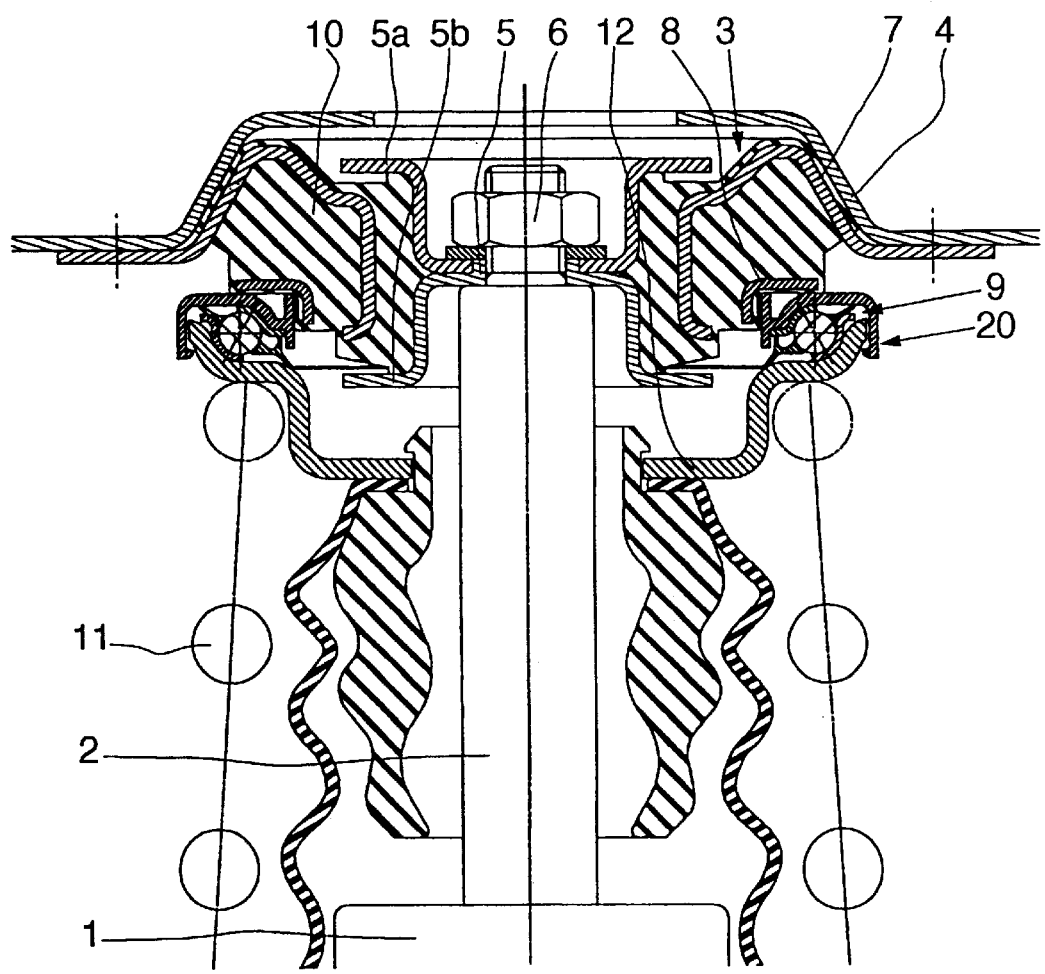
FIG. 1 is a view in axial section of the upper part of a vehicle suspension system including a thrust bearing in accordance with the invention.

The damper comprises a cylinder 1 in which a piston is able to slide, the rod 2 of the piston being bonded by the upper end to an elastic support block 3. The elastic support block 3 bears on an element of the frame 4 forming a seat, and is joined therewith. The elastic support block 3 includes:

- a metallic internal binding element 5, formed of two parts 5a and 5b and on which is mounted the end of the rod 2 or the damper piston by means of a nut 6.
- a metallic external binding element 7 used for the joining with the frame 4,
- a metallic upper cup 8 used for supporting seat for the thrust bearing 9,
- a block of rubber 10 bonded to the surface of the above three elements and binding them together with filtering of the vibrations.

One end of the external binding element 7 is fixed on the frame 4, for example by screwing, and the other end is arranged axially between the two parts 5a and 5b. The upper cup 8 is arranged axially on the level of the internal binding element 5 but is of a greater diameter.

Also visible is the suspension spring 11, the upper end of which bears against the lower cup 12 which, in turn, also bears against the thrust bearing 9. The cup 12 is made of sheet steel.

Figure 2:
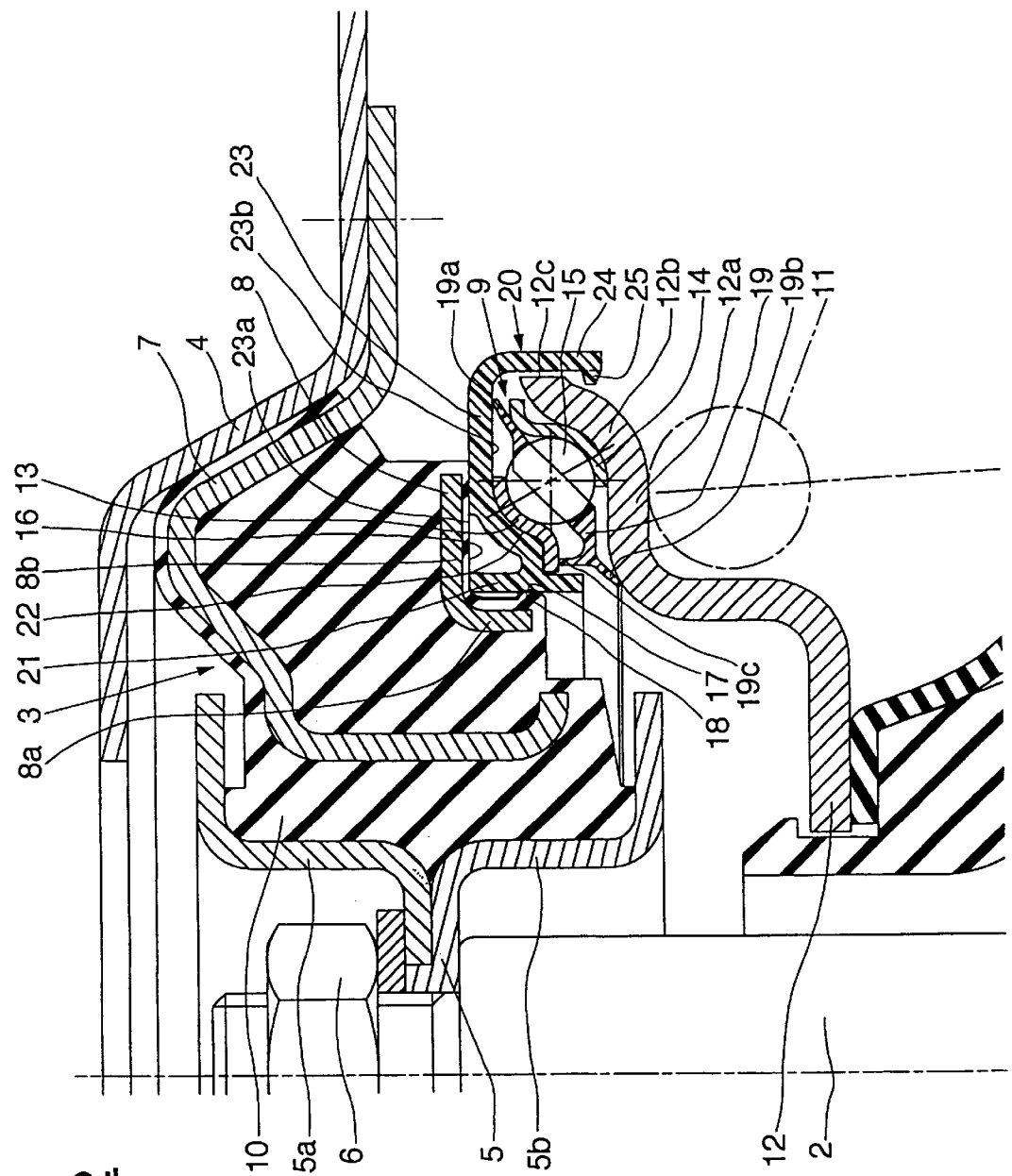
FIG. 2 is a half view in axial section of a suspension thrust bearing in accordance with the invention.

As better seen in FIG. 2, the upper cup 8 comprises a cylindrical portion 8a extending downwards, away from the frame 4, and a radial portion 8b extending outwards the entire upper cup 8 being embedded in the elastic material used in the elastic support block 10 which close to the said upper cup 8 offers a radial part forming a bearing surface 16 and an axial part 17 defined by a radial annular projection 18.

The suspension thrust bearing 9 proper comprises an upper race 13 and a lower race 14 both made of sheet steel, between which balls 15 are housed.

The balls 15 of the thrust bearing 9 are held by a cage 19 made of synthetic material, which is extended an one side by a sealing lip 19a which rubs against the lower race 14, and on the other side by a lip 19b which rubs against a surface of the bearing cup 12. A lip 19c adjacent to the lip 19b rubs against the upper race 13.

The lower race 14 and the spring 11 are in contact with the cup 12, on each side of a radial portion 12a. This radical portion 12a is extended outwards and upwards towards the frame 4 in the form of a curved portion 12b which is concave on the side of the lower race 14 and which in terms of shape mates with the said curved portion 12b, this making it possible to use a thin sheet from which to make the said lower race 14.

Placed between the upper race 13 of the thrust bearing 9 and the elastic support block 3 is a cap 20 made of synthetic material, preferably a material that can be moulded. The material forming the cap 20 will be choosen among plastics, for example a polyamide loaded or not with glass fibers. The cap 20 comprises a cylindrical internal portion 21 mounted in contact with the radial part 16 by means of one of its ends, and with the axial part 17 on which the cylindrical internal portion 21 comes for centering by means of its internal diameter.

The cap 20 is extended from the cylindrical internal portion 21 by a radial portion 23 having a toroidal concave surface 22 on the side and at the level of upper race of the bearing and mating with said race and a radial plane surface 23a on the side of the radial part 16 of the elastic support block 3. A plane surface 23b is fitted together on the concave surface 22 and forms a rubbing surface for a sealing lip 19a of the cage 19.

The radial portion 23 extends beyond the periphery of the lower cup 12 and is extended downwards by a cylindrical portion 24 which surrounds the periphery of the lower cup 12. Inwardly facing hooks 25 are provided on the inner edge and at the lower end of the cylindrical portion 24 and have a similar diameter than the periphery 12c of the lower cup 12 for forming a diametral interference between those two elements.

The cap 20 transmits axial loads from the thrust bearing 9 to the elastic support block 3 via the radial surface 16, the mating between the surfaces in contact guaranteeing a good apportionment of the load. The axial part 17 assures a correct centring of the bearing 9 relative to the elastic support block 3. The cylindrical portion 24 of the cap 20 forms, with the periphery 12c of the lower cup 12, a seal on account of the narrow passage which supplements the action of the lip 19a of the cage 19. Prior to the mounting of the suspension thrust bearing on tile elastic support block 3, the cap 20 prevents the lower cup 12 from becoming separated from the various elements of the thrust bearing 9 and of the cap 20 itself thanks to its hooks 25 which limit any axial movement with respect to the lower cup 12.

To assemble these elements, the lower race 14 is placed in the lower cup 12. The cage 19 equipped with its balls 15 is placed in the lower race 14. The assembly is capped with the upper race 13 then with the cap 20, which snap-fastens by means of its hooks onto the periphery 12c of the lower cup 12. Assembly requires no angular orientation of the various components with respect to one another. The axial portion 17 of the elastic support block 3 is designed to exert a slight radial preload on the cylindrical portion 21 of the cap 20 so that the said cap 20 is retained axially with respect to the elastic support block 7 during assembly.

Figure 3:
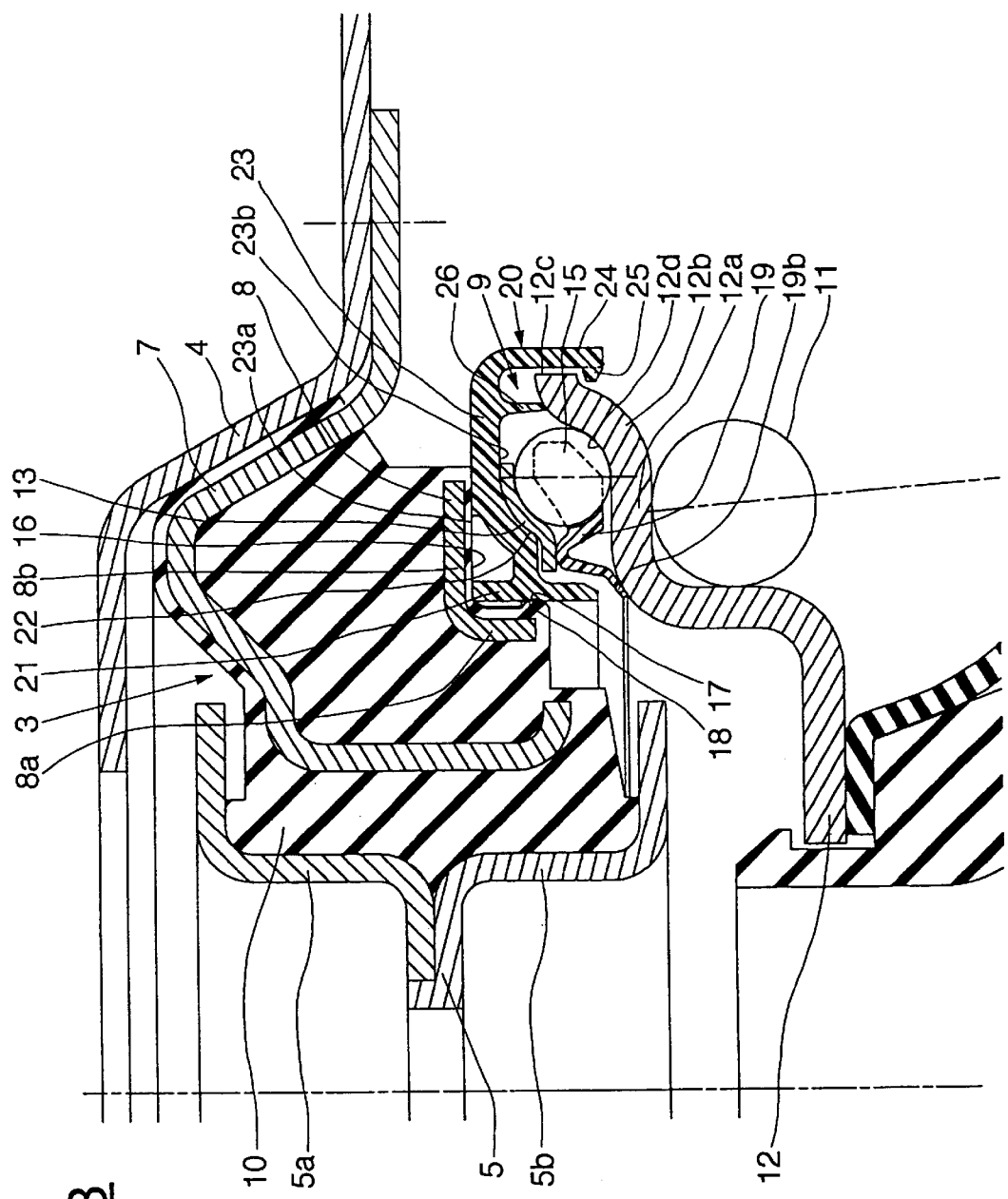
FIGS. 3 to 5 show alternative forms of the embodiment of FIG. 2.

The embodiment illustrated in FIG. 3 is similar to the one in FIG. 2 except that the lower race is formed as one piece with the lower cup 12, the balls 15 coming directly into contact with a toroidal surface 12d of the lower cup 12, which fulfils the function of a lower race. The toroidal surface 12d may have undergone a surface hardening treatment. The cap 20 comprises a more or less cylindrical sealing lip 26 of a diameter smaller than that of the outer cylindrical portion 24 and extending downwards from the radial portion 23 to come into rubbing contact with the lower cup 12 close to its periphery 12c. The scaling lip 26 replaces the sealing lip 19a of FIG. 2.

Figure 4:
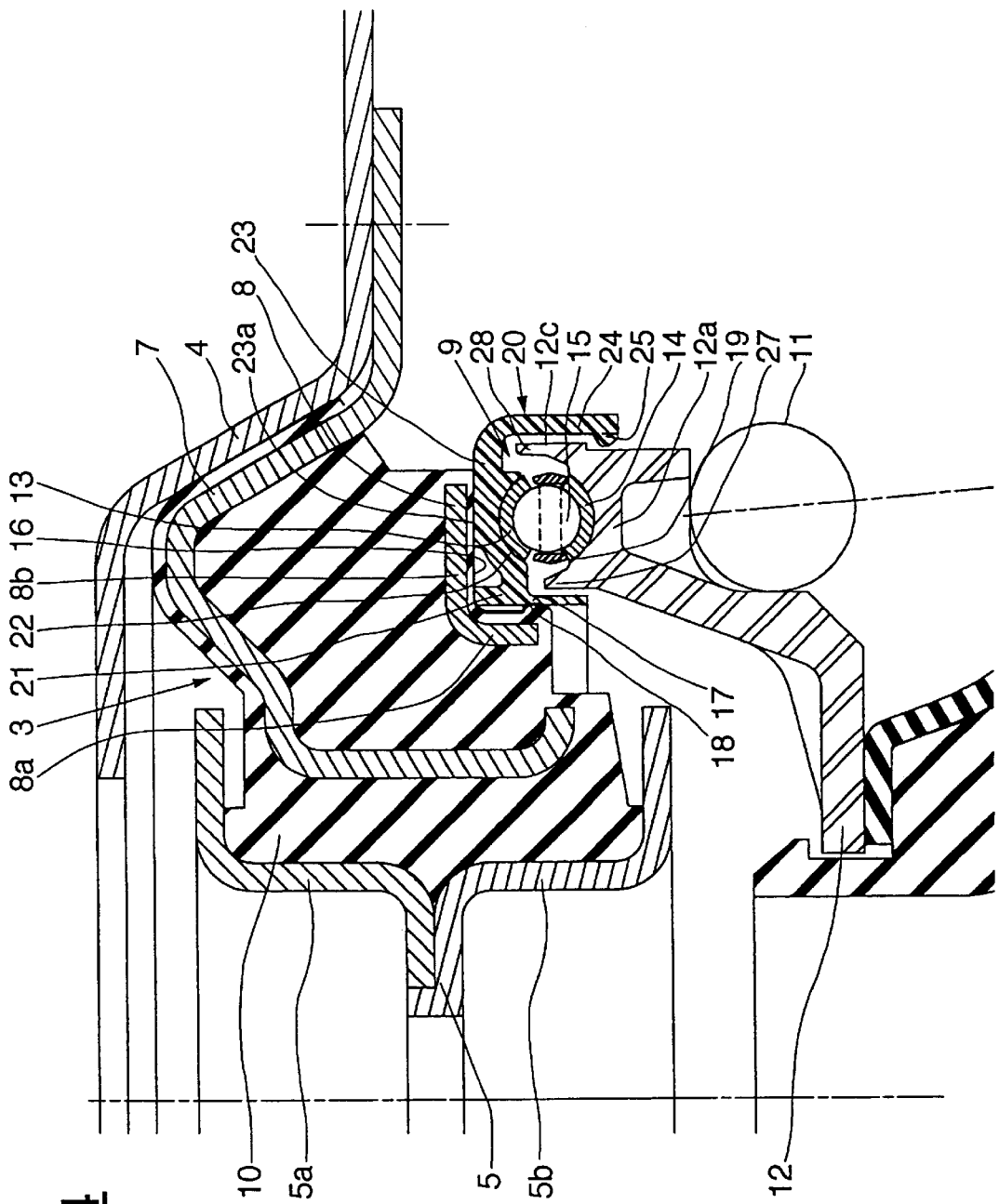

The embodiment illustrated in FIG. 4 is similar to the one in FIGS. 1 and 2, except that the lower cup 12 forming a seat for the spring is made of light alloy, for example an aluminium-based alloy, which allows an appreciable saving in weight compared with pressed steel and allows more complex shapes to be obtained. The upper race 13 and lower rare 14 of the thrust bearing 9 are identical, which results in an additional saving. The lower cup 12 may comprise an annular portion 27 extending between the thrust bearing 9 and the inner cylindrical portion 21 of the cap 20 upwards in the direction of the curved portion 22, to form a seal thanks to a narrow passage with the said cylindrical portion 21. On the other side of the rolling bearing 9, the lower cup 12 is provided with an extension 28 extending between the said bearing 9 and the outer cylindrical portion 24 of the cap 20 and here too, allowing a seal to be formed by making a narrow passage between the periphery 12c and the said outer cylindrical portion 24.

Figure 5:
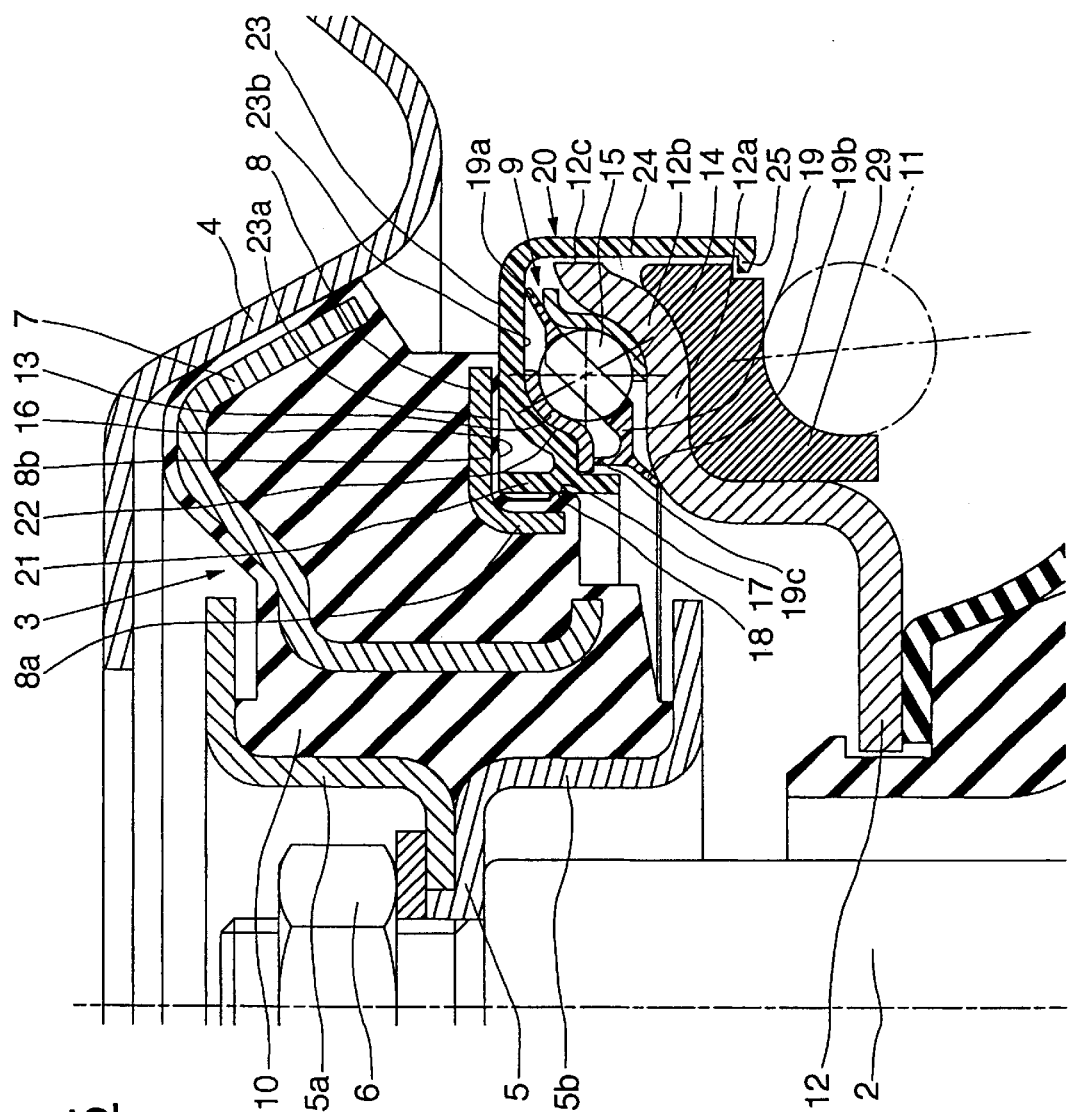

In the embodiment of FIG. 5, the spring 11 bears on the metallic bearing cup 12 by means of an inserted bearing seat 29 made of synthetic material and axially arranged between the cup 12 and the spring 11 as to provide a better support between spring and cup and to eliminate the risks of parasitic noises that could arise from steel/steel friction between spring and cup. In this embodiment, one takes advantage of the intermediary bearing seat 29 for carrying out the axial bind between lower cup 12 and bearing 9.

Generally speaking, the carrying out of the cup 12 in metal (steel or light alloy) allows a space saving in the axial direction with regard to a cup made of plastic material that must be relatively thick so as to bear the mechanical loads, exerted on said cup. Like that, the axial dimension of the device is reduced.

Thanks to the invention, an assembly combining the suspension thrust stop and the lower cup forming the spring seat is obtained in a particularly economical way. This assembly has a small axial bulk and can be transported without any fear of the components becoming lost while at the same time allowing automated assembly.

What is claimed is:

1. A suspension thrust stop drive comprising:
   a cap;
   a rolling bearing forming an axial thrust stop, a cup adapted for receipt of a vehicle suspension spring, and an elastic support clock, the rolling bearing being placed between the cup and the elastic support block with said support block being adapted for securement to a vehicle frame, the rolling bearing comprising an upper race placed inside said cap with said cap acting as an interface between said race and the elastic support block in contact with the cap, and a lower race, said cap having means of axially retaining the cup to form a unit assembly, wherein part of the cap covers the periphery of the cup and forms a means of axially retaining the cup relative to the cap, and said cup being made of metal.

2. Device according to claim 1, wherein the cap comprises at least a radial protuberance directed inwardly and arranged on a bore surface of a cylindrical part of said cap.

3. Device according to claim 2, characterized in that the cap comprises a sealing means adapted to cooperate with the cup.

4. Device according to claim 3, characterized in that the cap comprises a sealing lip.

5. Device according to claim 1, wherein a cylindrical part of the cap forms a narrow passage with the periphery of the cup.

6. Device according to claim 1, wherein the cap comprises a cylindrical part and a radical part adjacent to the cylindrical part with said radical part provided with a surface for bearing against the support block.

7. Device according to claim 1, wherein the cap comprises a part of a shape that mates with the upper race.

8. Device according to claim 1, wherein the cap comprises an inner cylindrical part interacting at its internal diameter with an axial part of the support block for centering of said cap.

9. Device according to claim 1, wherein the lower race and the cup form a single piece.

10. Device according to claim 1, wherein the two races of the rolling bearing are identical.

11. Device according to claim 10, characterized in that the cup is made of light alloy.

12. Device according to claim 1, wherein the cap is made of a flexible synthetic material.

13. Device according to claim 1, wherein the axial retaining of the bearing cup with the cap is made by diametral interference between the means of axially retaining of the cap and the periphery of the bearing cup.

14. Device according to claim 1, further comprising an intermediary bearing seat positioned between said cup and said rolling bearing, the axial retaining of the bearing cup with the cap is made by diametral interference between the means of axially retaining of the cap and the periphery of the intermediary bearing seat of the spring arranged axially between the spring and the bearing cup.

15. A suspension thrust stop device for a vehicle, comprising;
   an elastic support block, adapted for securement to a frame of the vehicle;
   a metal cup, adapted for receiving a suspension spring of the motor vehicle; and
   a rolling bearing assembly, forming an axial thrust stop, placed between said cup and said elastic support block, said rolling bearing assembly comprising:
   a lower race, supported by the metal cup,
   an upper race,
   bearings housed between the upper race and the lower race, and said thrust stop device further comprising:
   a cap positioned so as to provide an interface between said race and said elastic support block with said cap being in contact with said elastic support block, said cap including an extension covering the periphery of said cup which includes means for axially retaining said cup relative to said cap to form a unit assembly.

16. The device according to claim 15, wherein said cap comprises at least a radial protuberance directed inwardly and arranged on a bore surface of a cylindrical part of said cap.

17. The device according to claim 16, wherein said cap comprises sealing means for forming a sealing relationship to cooperate with the cup.

18. The device according to claim 17, wherein said sealing means is a sealing lip.

19. The device according to claim 15, wherein an outer cylindrical portion of the cap forms with the periphery of the cup a narrow passage.

20. The device according to claim 15, wherein the cap comprises a radial portion positioned axially above said upper race and provided with a surface for bearing against the elastic support block.

21. The device according to claim 15, wherein the radial portion of the cap defines a shape that mates with the upper race.

22. The device according to claim 15, wherein the cap comprises an inner cylindrical portion which contacts by its internal diameter an axial part of the support block on which the cap is centered.

23. The device according to claim 15, wherein the lower race and the metal cup comprise a single piece.

24. The device according to claim 15, wherein the upper race and the lower race are of the same shape.

25. The device according to claim 24, wherein the cup is comprised of light alloy.

26. The device according to claim 15, wherein the cap is comprised of a flexible synthetic material.

27. The device according to claim 15, wherein the metal cup is axially retained with respect to the cap by diametral interference between the means for axially retaining the cap and the periphery of the cup.

28. The device according to claim 15, wherein the metal cup is axially retained with respect to the cap by diametral interference between the means for axially retaining the cap and the periphery of an intermediary bearing seat for the suspension spring arranged axially between the spring and the bearing cup.

29. The device according to claim 15, wherein the elastic support block comprises a metallic external binding element which joins the elastic support block to the frame of the motor vehicle.

30. The device according to claim 15, wherein said bearings are ball bearings and said roller bearing comprises a cage holding a plurality of ball bearings, wherein said cage includes a first sealing lip which contacts the lower race, and a second sealing lip which contacts the metal cup, and wherein said cage further comprises a third sealing lip which contacts the upper race.

31. The device according to claim 15, wherein the metal cup is provided with a radial portion extended outward and upward toward a frame section of the motor vehicle in the form of a curved portion which is concave on the side of the lower race, which curved portion is shaped to mate with the lower race.

32. A method of assembling the thrust-bearing device according to claim 15, comprising:

providing the bearing assembly in the metal cup; and capping the bearing assembly with the cap, by snap-fastening the cap on the periphery of the cup with said means of axially retaining and;

wherein no angular orientation of the various components is required for assembly of the thrust bearing device.

33. The device according to claim 15, wherein the bearings come into direct contact with a toroidal surface of the metal cup.

34. The thrust-bearing device according to claim 33, wherein the toroidal surface is surface-hardened.

* * * * *